(12) United States Patent  
Moruzzi

(10) Patent No.: US 7,774,909 B2  
(45) Date of Patent: *Aug. 17, 2010

(54) SYSTEM FOR REMOVING HEAT TRANSFER FINS FROM BOILER TUBES

(76) Inventor: James Moruzzi, 22 Dopping Brook Rd., Sherborn, MA (US) 01770

( * ) Notice: Subject to any disclaimer, the term of this patent is extended or adjusted under 35 U.S.C. 154(b) by 0 days.

This patent is subject to a terminal disclaimer.

(21) Appl. No.: 11/377,839

(22) Filed: Mar. 16, 2006

(65) Prior Publication Data

US 2006/0254040 A1 Nov. 16, 2006

Related U.S. Application Data

(60) Provisional application No. 60/662,448, filed on Mar. 16, 2005.

(51) Int. Cl.
*B23P 23/00* (2006.01)
*B23C 5/00* (2006.01)

(52) U.S. Cl. .................. 29/33 T; 29/50; 409/232; 408/204

(58) Field of Classification Search ............ 29/890.031, 29/566, 566.1, 50, 33 T; 408/80, 82, 79, 408/201, 204, 207, 209, 703, 223–225; 82/128, 82/113; 30/93–99, 1.5, 90.1, 90.2, 90.3; 409/232, 234
See application file for complete search history.

(56) References Cited

U.S. PATENT DOCUMENTS

| 221,692 | A | * | 11/1879 | Miller | ........................ 408/204 |
|---|---|---|---|---|---|
| 3,075,219 | A | * | 1/1963 | Ott | ........................ 15/104.04 |
| 3,396,467 | A | * | 8/1968 | Scocozza | ........................ 30/95 |
| 3,999,452 | A | * | 12/1976 | Larsen | ........................ 82/113 |
| 4,691,600 | A | * | 9/1987 | Carlson et al. | ........................ 82/113 |
| 5,044,075 | A | * | 9/1991 | Brennan et al. | ........................ 29/890.031 |
| 5,171,111 | A | * | 12/1992 | Kishimoto | ........................ 408/67 |
| 5,304,018 | A | * | 4/1994 | LaVanchy et al. | ........................ 408/1 R |
| 5,316,416 | A | * | 5/1994 | Kim | ........................ 408/145 |
| 5,542,177 | A | * | 8/1996 | Hillestad | ........................ 29/890.03 |
| 5,597,274 | A | * | 1/1997 | Behner | ........................ 408/204 |
| 5,741,097 | A | * | 4/1998 | Murphy, II | ........................ 409/180 |
| 6,152,661 | A | * | 11/2000 | Thrasher | ........................ 408/204 |
| 6,315,505 | B1 | * | 11/2001 | Moore | ........................ 407/42 |
| 7,305,746 | B2 | * | 12/2007 | Moruzzi | ........................ 29/50 |
| 2007/0098509 | A1 | * | 5/2007 | Hall | ........................ 409/132 |
| 2007/0122246 | A1 | * | 5/2007 | Moruzzi | ........................ 409/64 |

OTHER PUBLICATIONS

"The Negative and Positive of Rake Angles in Files", originally published in "Automated Endo Update", May 4, 1994.*
Brochure from Lindsay Cutting Tools, Apr. 22, 2003.*

* cited by examiner

*Primary Examiner*—Erica E Cadugan
(74) *Attorney, Agent, or Firm*—Devine, Millimet & Branch, P.A.; Paul C. Remus; Raymond I. Bruttomesso, Jr.

(57) ABSTRACT

A system is disclosed to use a rotary milling head to break or cut the bond of a heat transfer fin base to a boiler tube, thereby removing the heat transfer fins from the boiler tube to facilitate the more efficient repair of the boiler tube.

16 Claims, 6 Drawing Sheets

SYSTEM FOR REMOVING HEAT TRANSFER FINS FROM BOILER TUBES

CROSS-REFERENCE TO RELATED APPLICATIONS

The present application claims the benefit of provisional patent application Ser. No. 60/662,448 filed Mar. 16, 2005, which is incorporated herein by reference.

TECHNICAL FIELD

This invention relates to the repair of boiler tubes. More specifically, it relates to a system for removing heat transfer fins from a section of boiler tube to facilitate the repair of the boiler tube.

BACKGROUND OF THE INVENTION

Steam-generating boilers are generally large structures containing numerous boiler tubes, usually made of steel, that are in thermal contact with a burning fuel, such as coal. The burning fuel heats water circulating through the boiler tubes. The heated water, or more usually the resulting steam, is used to drive turbines for generation of electricity or other purposes. In order to facilitate thermal transfer to the water in a boiler tube, heat transfer fins are placed around the boiler tube. They are typically brazed or welded to the boiler tube by high frequency welding.

Because of deterioration due to corrosion and the like, boiler tubes may require replacement. Ordinarily repair of a damaged boiler tube involves cutting and removal of the damaged section of the tube and replacement with a new section. The section of boiler tube to be replaced is generally cut out using a power saw or cutting torch. However, heat transfer fins on the boiler tube must first be removed to gain access to the boiler tube. Removal of the heat transfer fins from the boiler tube has, before the present invention, been done with portable power tools such as a grinding tool having a rotary abrasive wheel or with air chisels. These techniques are at best time consuming. It is, therefor, an object of the present invention to remove heat transfer fins from boiler tubes more quickly and efficiently.

SUMMARY OF THE INVENTION

The present invention is a system for breaking or cutting the bonds holding a heat transfer fin base to a boiler tube. It includes a rotary milling head that has a cutting tip that traverses a circular path slightly larger than the outer diameter of the boiler tube. The cutting tip extends between adjacent windings of the heat transfer fin base. As the rotary milling head is rotated, the cutting tip cuts or breaks the bonds of the heat transfer fin base by exerting forces both in the direction of rotation of the rotary milling head and in the direction toward the rotary milling head. The rotary milling head is also guided and stabilized by a mandrel that fits on the inside of the boiler tube.

BRIEF DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
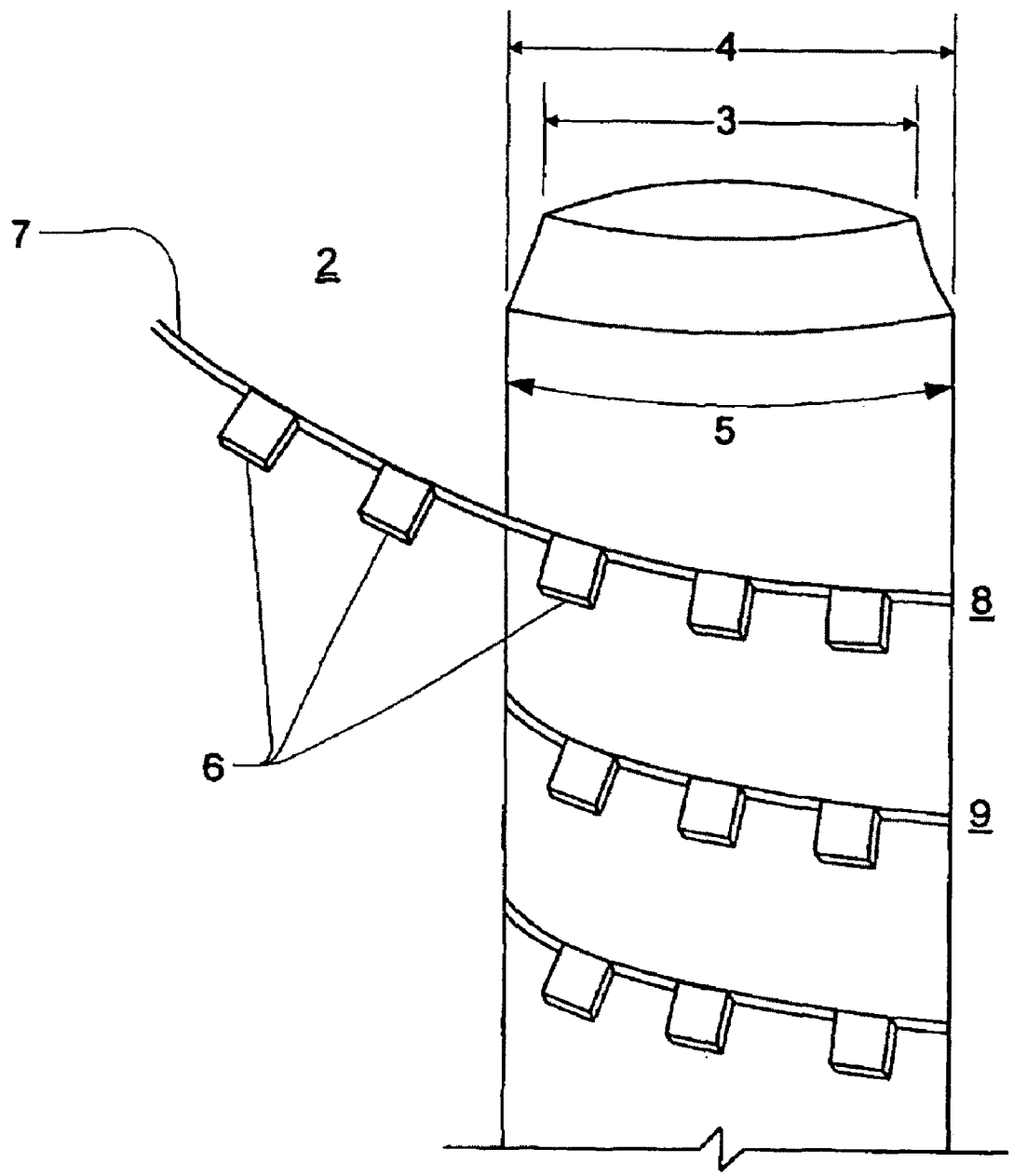
FIG. 1 is a schematic diagram of a heat transfer base as it is wound around a boiler tube.

FIG. 1 shows a boiler tube 2 with inner diameter 3, an outer diameter 4 and a circumference 5. Heat transfer fins 6 are attached to a heat transfer fin base 7 that is wound around the tube 2 in a corkscrew fashion. The base 7 is then bonded to the boiler tube, typically by brazing or welding. Thus, one winding 8 of the base 7 is adjacent to another winding 9 of the base 7.

Figure 2:
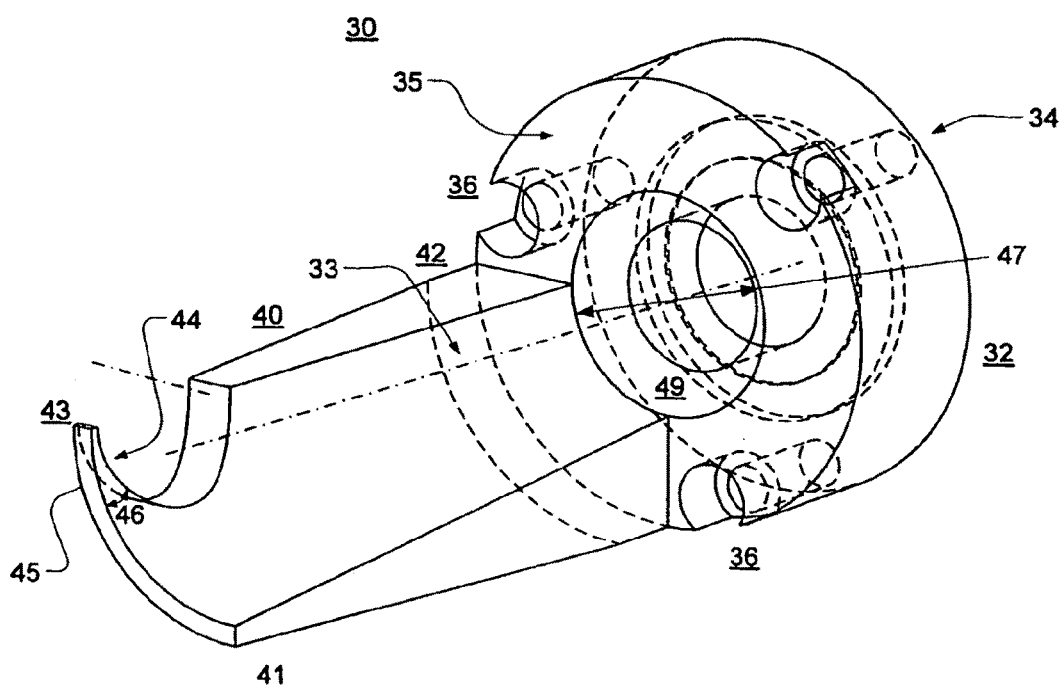
FIG. 2 is a schematic diagram of a preferred embodiment of the present invention.
Figure 3:
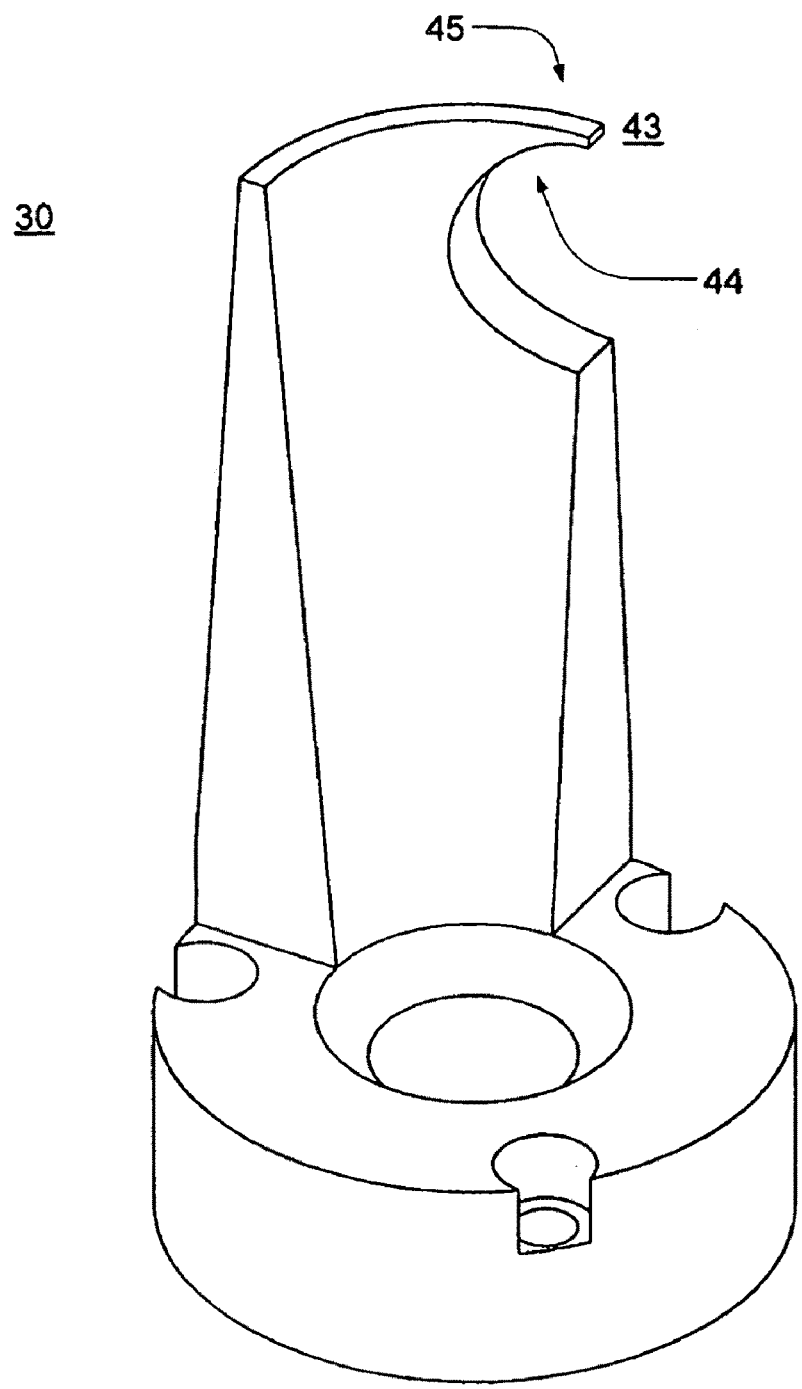
FIG. 3 is a diagram of another preferred embodiment of the present invention.

The present invention is a system for removing the heat transfer fins from the boiler tube 2 by cutting or breaking the bonds holding the heat transfer fin base 7 to the boiler tube 2. As shown in FIGS. 2 and 3, a preferred embodiment of the rotary milling head 30 of the present invention includes a milling head base 32 rotatable around a center of rotation 33 extending through a first side 34 and a second side 35 with the first side 34 adapted to be connected to a means of rotation. This embodiment has three holes 37 extending through the first side 34 to allow it to be attached to a power tool or other means of rotation.

A cutting tool 40 has a cutting end 41 and a mounting end 42 with the mounting end 42 attached to the second side 35 of the milling head base 32. The cutting end 41 of the cutting tool 40 is attached to a cutting tip 43 that comprises an upper cutting surface 44 and a lower cutting surface 45 that intersect at a cutting angle 46. The cutting tip 43 is oriented to move in the direction of rotation of the milling head base 32.

The mounting end 42 of the cutting tool 40 is attached to the second side 35 of the milling head base 32 a distance from the center of rotation 33 of the milling head base 32 such that the cutting tip 43 traverse a circular path whose diameter 47 is slightly larger than the outside diameter 4 of a boiler tube 2 when the milling head base 32 is rotated. It is to be understood that both the means for attaching mounting end 42 of the cutting tool 40 to the second side 35 of the milling head base 32 and the means for attaching the cutting end 41 of the cutting tool 40 to the cutting tip 43 include manufacturing cutting tip 43, the cutting tool 40, and the milling head base 32 out of one piece of metal, as well as other means known to those skilled in the art.

Figure 5:
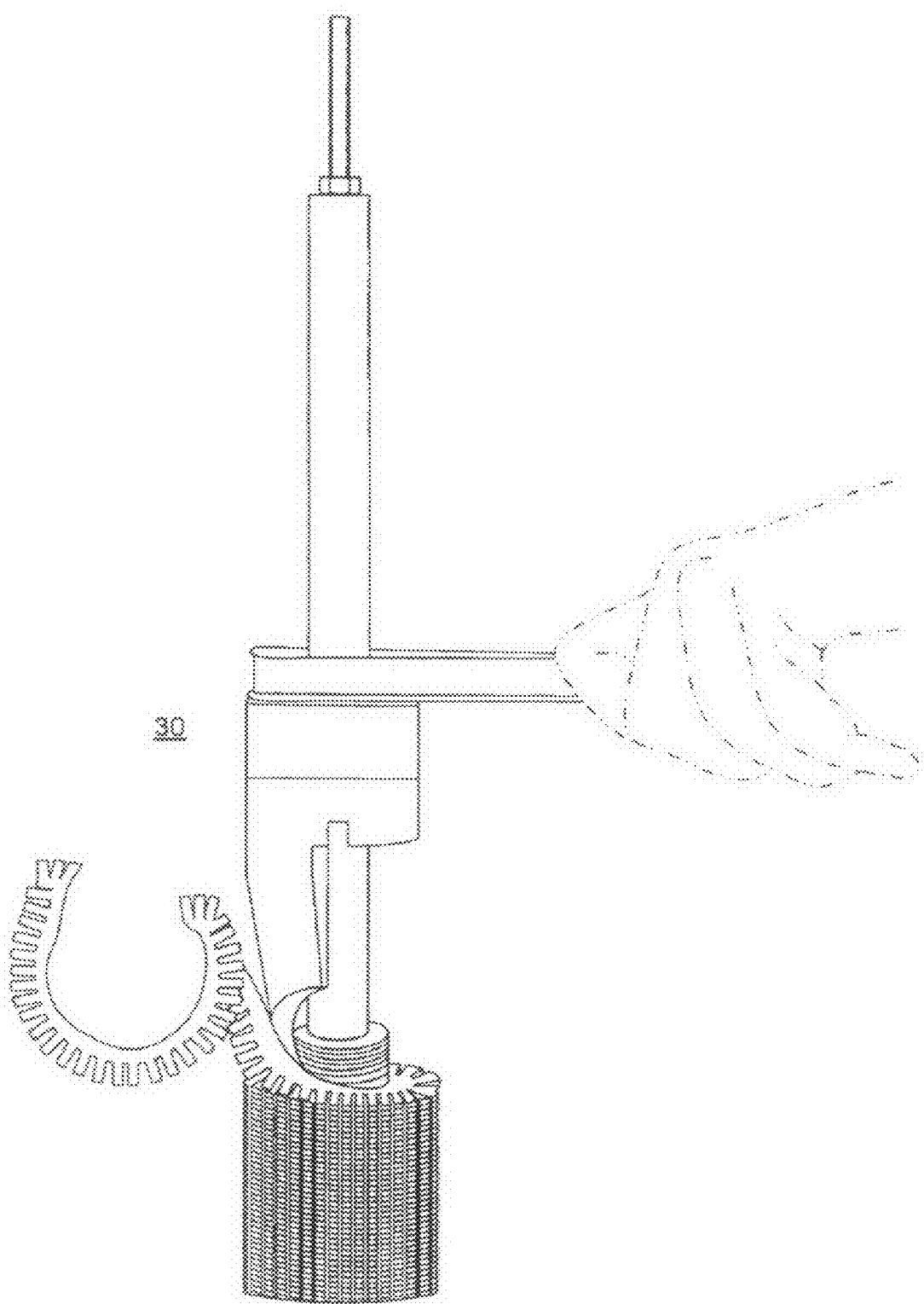
FIG. 5 is a diagram of an embodiment of the present invention with a manual means of rotation.

Also, as shown in FIGS. 2, 3 and 5, in operation, another preferred embodiment of the present invention, has a cutting tip 43 that extends between adjacent windings 8, 9 of the heat transfer fin base 7. The bond of the base 7 to the boiler tube 2 in one of the windings 8, 9 is cut or broken by forces exerted by the cutting tip 43 both in the direction of rotation of the milling head base 32 and in the direction toward the milling head base 32 as the cutting tool 40 is rotated around the boiler tube 2. In this preferred embodiment, the cutting angle 46 formed by the upper cutting surface 44 and the lower cutting surface 45 of the cutting tip 43 is chosen based on the spacing of the rows 8, 9 of the heat transfer fin base 7. The cutting tip 43 may be constructed of S7 steel or other steels known to those skilled in the art.

Further, as shown in FIG. 5, in operation, the cutting tool 40 is rotated around the boiler tube 2 and the cutting tip 43 breaks or cuts the bond of the heat transfer fin base 7 to the boiler tube 2. The cutting tool 40 can be rotated manually as shown in FIG. 5 or through the use of other means of rotation, including an electric or pneumatic power tool. In another preferred embodiment of the present invention, the cutting angle 46 is such that it causes the cutting tip 43 to advance or self-feed as the cutting tool 40 is rotated around the boiler tube 2. In another embodiment, gravity may be utilized to cause such an advance.

Figure 4:
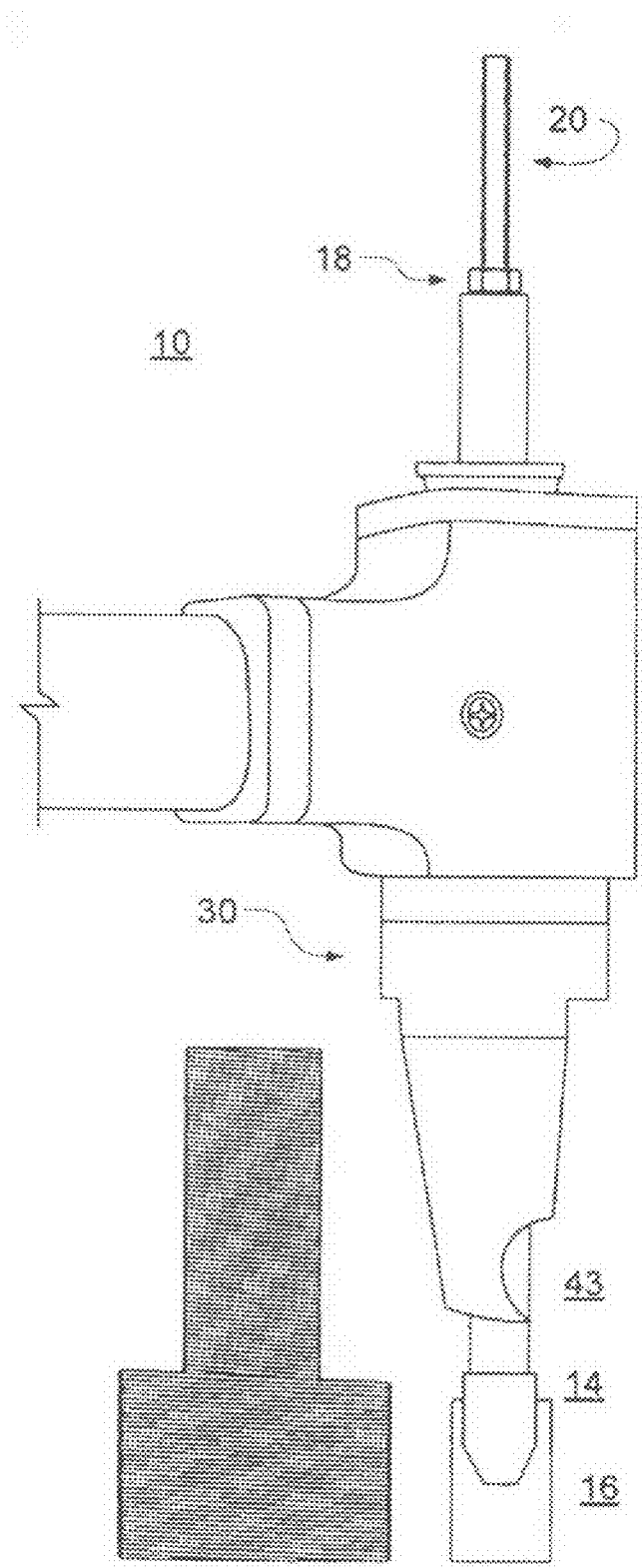
FIG. 4 is a diagram of an embodiment of the present invention with a pneumatic means of rotation.

In another embodiment of the present invention, as shown in FIG. 4, a power tool 10 is used to rotate the rotary milling head 30. The power tool 10 also has a means to guide and stabilize the rotary milling head 30, which in this embodiment is a mandrel 14, but which may be other means known to those skilled in the art. The mandrel 14 fits on the inside of the boiler tube 2 to guide and stabilize the rotary milling head 30 during operation. The mandrel 14 has three clamp fingers 16 to lock against the inner diameter 3 of the boiler tube. The clamp fingers 16 are extended by turning the nut 18 on an extension of the mandrel 20 extending out of the back of the power tool 10. In yet another embodiment of the present invention, the cutting tip 43 can be advanced by a feed mechanism, not here shown but known to those skilled in the art, on the extension of the mandrel 20.

As indicated above with respect to FIGS. 2, 3, and 5, the forces exerted by the one and only one cutting tip 43 on the base 7 of the windings 8, 9 to cut or break the bond are both in the direction of rotation of the milling head base 32 and in the direction of the milling head base 32. Still referring to FIG. 4, the upper cutting surface 44 at the cutting tip 43 extends transversely relative to the axis of rotation of the cutting head, and is an arcuate surface.

The cutting angle 46 formed between the lower cutting surface 45 and the upper cutting surface 44 is formed to break or cut the bonds. The lower cutting surface 45 in FIG. 4 at the cutting tip 43 extends transversely relative to a central rotational axis of the milling head 30. The orientation of the cutting surfaces 44 and 45 of the cutting tip 43 is such that they extend between adjacent windings 8, 9 of the heat transfer fin base 7. The bond of the base 7 to the boiler tube 2 in one of the windings 8, 9 is cut or broken by forces exerted by the cutting tip 43 both in the direction of rotation of the milling head base 32 and in the direction toward the milling head base 32 as the cutting tool 40 is rotated around the boiler tube 2.

Figure 6:
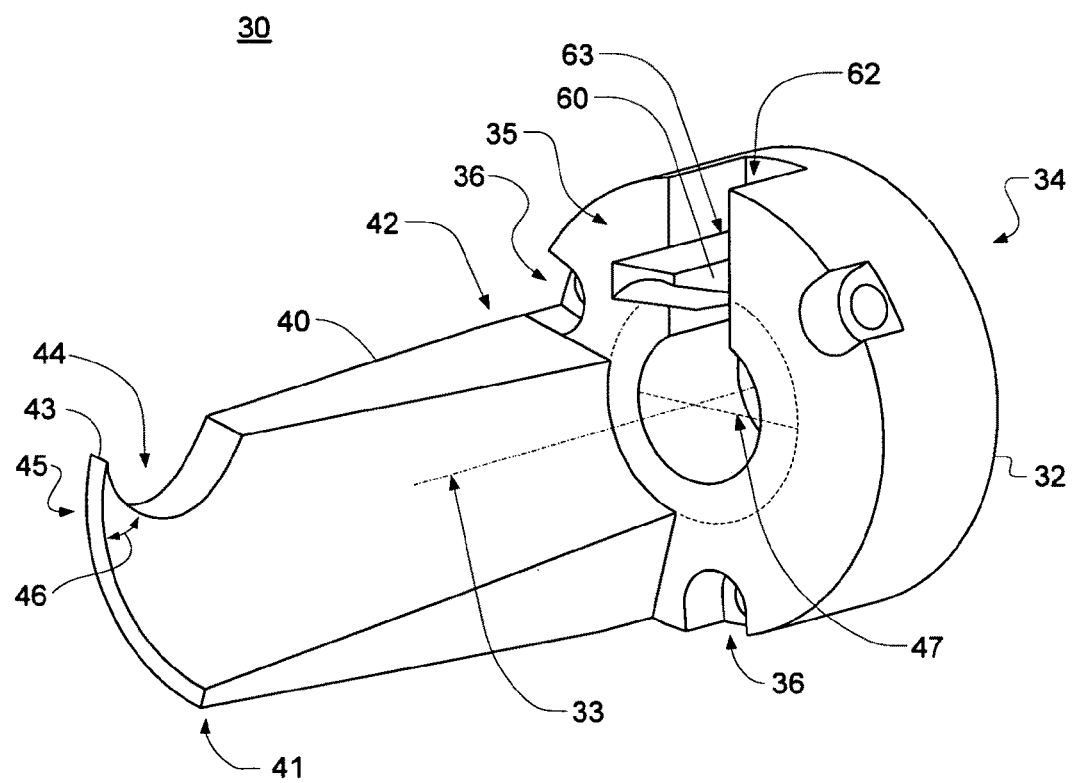
FIG. 6 is a schematic diagram of another preferred embodiment of the present invention.

Yet another preferred embodiment of the rotary milling head of the present invention is shown in FIG. 6. This embodiment includes a bevel cutting blade 60 that is capable of forming a frustoconical bevel 61 on the end of the boiler tube 2, as shown in FIG. 1. The second side 35 of the milling head base 32 has one or more recesses 62. The bevel cutting blade 60 has a blade securing portion 63 that fits into the recess 62 and is secured therein by a securing means, not here shown, such as a set screw or other securing means known to those skilled in the art. In operation, this embodiment removes the heat transfer fins from a boiler tube and forms a frustoconical bevel on the end of the boiler tube to facilitate welding, or otherwise connecting, the end of the boiler tube to the beveled end of another boiler tube.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

The invention claimed is:

1. A rotary milling head to cut or break a bond of a heat transfer fin base to a boiler tube, comprising:
   a milling head base rotatable around a center of rotation extending through a first side and a second side of the base with the first side adapted to be connected to a means of rotation, wherein the second side includes a lower surface of the milling head base that extends transversely relative to the center of rotation of the milling head;
   a cutting tool with a cutting end and a mounting end;
   a one and only one cutting tip attached to the cutting end that comprises an arcuate upper cutting surface and a lower cutting surface that intersect at a cutting angle defining a cutting edge which is transverse relative to the center of rotation of the milling head and the cutting tip is oriented to move in the direction of rotation of the milling head base such that the cutting edge leads both the lower cutting surface and the upper cutting surface; and
   a means to attach the mounting end of the cutting tool to the second side of the milling head base a distance from the center of rotation such that the cutting tip traverses a circular path whose diameter is slightly larger than an outside diameter of the boiler tube when the milling head base is rotated, thereby causing the cutting tip to exert forces on the heat transfer fin base in the direction of rotation of the cutting tip and in the direction toward the milling head base, and wherein a portion of the periphery of the lower surface of the milling head base is not contacted by the cutting tool mounting end.

2. The rotary milling head of claim 1 wherein the cutting angle is such that the one and only one cutting tip self-feeds as it advances to cut or break the bond of the heat transfer fin base.

3. A rotary milling head of claim 2 wherein the upper cutting surface at the cutting tip is transverse relative to the center of rotation of the milling head.

4. A rotary milling head of claim 3 wherein the lower cutting surface at the cutting tip is transverse relative to the center of rotation of the milling head.

5. The rotary milling head of claim 1 further comprising a bevel cutting blade secured to a recess in the second side of the milling head base.

6. A rotary milling head of claim 1 further comprising:
   a bevel cutting blade secured to a recess in the second side of the milling head base; and
   wherein the upper cutting surface of the one and only one cutting tip is transverse relative to the center of rotation of the milling head, the lower cutting surface of the one and only one cutting tip is transverse relative to the center of rotation of the milling head, and wherein the cutting angle between the upper cutting surface and the lower cutting surface is such that the cutting tip self-feeds as it advances to cut or break the bond of the heat transfer fin base.

7. A system to cut or break a bond of a heat transfer fin base of a boiler tube, comprising:
   a rotary milling head with a milling head base rotatable around a center of rotation extending through a first side and a second side of the base with the first side adapted to be connected to a means of rotation, wherein the second side includes a lower surface of the milling head base that extends transversely relative to the center of rotation of the milling head;

a means of rotation for rotating the milling head base;

a cutting tool with a cutting end and a mounting end;

a one and only one cutting tip attached to the cutting end that comprises an arcuate upper cutting surface and a lower cutting surface that intersect at a cutting angle defining a cutting edge which is transverse relative to the center of rotation of the milling head and that is oriented to move in the direction of rotation of the milling head base such that the cutting edge leads both the lower cutting surface and the upper cutting surface; and a means to attach the mounting end of the cutting tool to the second side of the milling head base a distance from the center of rotation such that the cutting tip traverses a circular path whose diameter is slightly larger than an outside diameter of the boiler tube when the milling head base is rotated, thereby causing the cutting tip to exert forces on the heat transfer fin base in the direction of rotation of the cutting tip and in the direction toward the milling head base, and wherein a portion of the periphery of the lower surface of the milling head base is not contacted by the cutting tool mounting end.

8. The system of claim 7 wherein the means of rotation are adapted for manual operation.

9. The system of claim 7 wherein the means of rotation are a pneumatic power tool.

10. The system of claim 7 further comprising a bevel cutting blade secured to a recess in the second side of the milling head base.

11. A rotary milling head of claim 7 wherein the upper cutting surface at the cutting tip is transverse relative to the center of rotation of the milling head.

12. A system of claim 11 wherein the lower cutting surface at the cutting tip is transverse relative to the center of rotation of the milling head.

13. A system of claim 7 further comprising:

a bevel cutting blade secured to a recess in the second side of the milling head base; and wherein the upper cutting surface at the cutting tip is transverse relative to the central rotational axis of the milling head, the lower cutting surface at the cutting tip is transverse relative to the center of rotation of the milling head, and wherein the cutting angle between the upper cutting surface and the lower cutting surface is such that the cutting tip self-feeds as it advances to cut or break the bond of the heat transfer fin base.

14. A system to cut or break a bond of a heat transfer fin base of a boiler tube, comprising:

a rotary milling head with a milling head base rotatable around a center of rotation extending through a first side and a second side of the base with the first side adapted to be connected to a means of rotation, wherein the second side includes a lower surface of the milling head base that extends transversely relative to the center of rotation of the milling head;

a means of rotation for rotating the milling head base;

a stabilizing means attached to the means of rotation to be inserted in the boiler tube to guide and stabilize the rotary milling head;

a cutting tool with a cutting end and a mounting end;

a one and only one cutting tip attached to the cutting end that comprises an upper cutting surface and a lower cutting surface that intersect at a cutting angle defining a cutting edge which is transverse relative to the center of rotation of the milling head and that is oriented to move in the direction of rotation of the milling head base such that the cutting edge leads both the lower cutting surface and the upper cutting surface; and a means to attach the mounting end of the cutting tool to the second side of the milling head base a distance from the center of rotation such that the cutting tip traverses a circular path whose diameter is slightly larger than an outside diameter of the boiler tube when the milling head base is rotated, thereby causing the cutting tip to exert forces on the heat transfer fin base in the direction of rotation of the cutting tip and in the direction toward the milling head base, and wherein a portion of the periphery of the lower surface of the milling head base is not contacted by the cutting tool mounting end.

15. The system of claim 14 wherein the stabilizing means are a mandrel.

16. The system of claim 14 further comprising a bevel cutting blade secured to a recess in the second side of the milling head base.

\* \* \* \* \*